(12) United States Patent
Michl et al.

(10) Patent No.: US 9,238,749 B2
(45) Date of Patent: Jan. 19, 2016

(54) AQUEOUS BINDER FOR GRANULAR AND/OR FIBROUS SUBSTRATES

(75) Inventors: Kathrin Michl, Ludwigshafen (DE);
Markus Braun, Heidelberg (DE);
Michael Kalbe, Weinheim (DE)

(73) Assignee: BASF SE, Ludwigshafen (DE)

(*) Notice: Subject to any disclaimer, the term of this patent is extended or adjusted under 35 U.S.C. 154(b) by 374 days.

(21) Appl. No.: 13/370,762

(22) Filed: Feb. 10, 2012

(65) Prior Publication Data

US 2012/0208001 A1 Aug. 16, 2012

Related U.S. Application Data

(60) Provisional application No. 61/442,309, filed on Feb. 14, 2011.

(51) Int. Cl.
*C08K 3/28* (2006.01)
*C09D 133/14* (2006.01)

(52) U.S. Cl.
CPC ............ *C09D 133/14* (2013.01); *C08L 2201/54* (2013.01); *Y10T 428/249921* (2015.04)

(58) Field of Classification Search
CPC ... C09D 133/14; C08L 2201/54; C08L 33/14; C08K 3/16; C08K 3/30
USPC .................. 524/548, 556, 236, 386
See application file for complete search history.

(56) References Cited

U.S. PATENT DOCUMENTS

| | | | |
|---|---|---|---|
| 4,076,917 A | 2/1978 | Swift et al. | |
| 4,380,600 A * | 4/1983 | Hosoda et al. | 524/458 |
| 5,143,582 A | 9/1992 | Arkens et al. | |
| 5,977,232 A * | 11/1999 | Arkens et al. | 524/404 |
| 6,221,973 B1 * | 4/2001 | Arkens et al. | 525/327.7 |
| 6,299,936 B1 * | 10/2001 | Reck et al. | 427/212 |

FOREIGN PATENT DOCUMENTS

| | | |
|---|---|---|
| DE | 2214450 | 10/1972 |
| DE | 40 03 422 A1 | 8/1991 |
| EP | 0 445 578 A2 | 9/1991 |
| EP | 0 583 086 A1 | 2/1994 |
| EP | 0 651 088 A1 | 5/1995 |
| EP | 0 672 920 A1 | 9/1995 |
| WO | WO 97/45461 A1 | 12/1997 |
| WO | WO 99/09100 A1 | 2/1999 |
| WO | WO 2010/034645 A1 | 4/2010 |

OTHER PUBLICATIONS

Chemical Book. 2014.*
Chemical Book (Sodium persulfate), 2014.*
Chemical Land21 (Sodium Lauryl Sulfate), 2014.*

* cited by examiner

*Primary Examiner* — Wenwen Cai
(74) *Attorney, Agent, or Firm* — Oblon, McClelland, Maier & Neustadt, L.L.P.

(57) ABSTRACT

Aqueous binders for granular and/or fibrous substrates are based on polyacids and polyols.

19 Claims, No Drawings

AQUEOUS BINDER FOR GRANULAR AND/OR FIBROUS SUBSTRATES

The present invention relates to an aqueous binder for granular and/or fibrous substrates, comprising as active constituents
a) at least one polymer obtainable by free-radical polymerization and comprising ≥5 wt % and ≤100 wt % of at least one α,β-monoethylenically unsaturated mono- or dicarboxylic acid in polymerized form [polymer A],
b) at least one polyol compound having at least two hydroxyl groups [polyol B], and
c) at least one salt compound which at 20° C. and 1 atm (absolute) has a solubility ≥10 g in 100 g of deionized water [salt C].

The present invention likewise relates to the use of the aqueous binder for production of shaped articles, to a process for producing shaped articles by using fibrous and/or granular substrates and aqueous binder, and also to the shaped articles themselves.

The consolidation of fibrous or granular substrates, more particularly in sheetlike structures, exemplified by fiber webs, fiberboards or chipboard panels, etc., is frequently accomplished chemically using a polymeric binder. To increase the strength, particularly the wet strength and thermal stability, in many cases binders are used which comprise crosslinkers that give off formaldehyde. As a consequence of this, however, there is a risk of unwanted formaldehyde emission.

For the purpose of avoiding formaldehyde emissions there have already been numerous alternatives proposed to the binders known to date. For instance U.S. Pat. No. 4,076,917 discloses binders which comprise carboxylic acid-containing or carboxylic anhydride-containing polymers and β-hydroxyalkylamides as crosslinkers. A disadvantage is the relatively costly and inconvenient preparation of the β-hydroxyalkylamides.

EP-A 445578 discloses boards made of finely divided materials, such as glass fibers, for example, in which mixtures of high molecular weight polycarboxylic acids and polyhydric alcohols, alkanolamines, or polyfunctional amines act as binders.

EP-A 583086 discloses formaldehyde-free aqueous binders for producing fiber webs, more particularly glass fiber webs. The binders comprise a polycarboxylic acid having at least two carboxylic acid groups and also, optionally, anhydride groups, and a polyol. These binders require a phosphorus-containing reaction accelerant in order to attain sufficient strengths on the part of the glass fiber webs. It is noted that the presence of such a reaction accelerant is vital unless a reactive polyol is used. Highly reactive polyols specified include β-hydroxyalkylamides.

EP-A 651088 describes corresponding binders for substrates made from cellulosic fiber. These binders mandatorily comprise a phosphorus-containing reaction accelerant.

EP-A 672920 describes formaldehyde-free binding, impregnating or coating compositions which comprise at least one polyol and a polymer which is composed to an extent of 2% to 100% by weight of an ethylenically unsaturated acid or acid anhydride comonomer. The polyols are substituted triazine, triazinetrione, benzene or cyclohexyl derivatives, and the polyol radicals are always located in positions 1, 3, and 5 of the aforementioned rings. In spite of a high drying temperature, the wet tensile strengths obtained with these binders on glass fiber webs are low.

DE-A 2214450 describes a copolymer composed of 80% to 99% by weight of ethylene and 1% to 20% by weight of maleic anhydride. Together with a crosslinking agent, the copolymer is used in powder form or in dispersion in an aqueous medium for the purpose of surface coating. The crosslinking agent used is a polyalcohol which contains amino groups. In order to bring about crosslinking, however, heating must be carried out at up to 300° C.

U.S. Pat. No. 5,143,582 discloses the production of heat-resistant nonwoven-web materials using a thermosetting heat-resistant binder. The binder is formaldehyde-free and is obtained by mixing a crosslinker with a polymer containing carboxylic acid groups, carboxylic anhydride groups or carboxylic salt groups. The crosslinker is a β-hydroxyalkylamide or a polymer or copolymer thereof. The polymer crosslinkable with the β-hydroxyalkylamide is synthesized, for example, from unsaturated monocarboxylic or dicarboxylic acids, salts of unsaturated monocarboxylic or dicarboxylic acids, or unsaturated anhydrides. Self-curing polymers are obtained by copolymerizing the β-hydroxyalkylamides with monomers comprising carboxyl groups.

WO 99/09100 discloses thermally curable compositions comprising, in addition to an alkanolamine having at least two OH groups, a polymer 1 and a further polymer 2 comprising respectively ≤5 wt % and ≥15 wt % of an α,β-ethylenically unsaturated mono- or dicarboxylic acid in polymerized form, and the use of said compositions as formaldehyde-free binders in the manufacture of shaped articles.

Furthermore WO10/34645 discloses aqueous binder systems for granular and/or fibrous substrates, comprising as active constituents a polymer 1, comprising ≥5.5 wt % and ≤20 wt % of an α, β-ethylenically unsaturated mono- or dicarboxylic acid in polymerized form, a polymer 2, comprising ≥40 wt % of an α,β-ethylenically unsaturated mono- or dicarboxylic acid in polymerized form, and a polyol compound having at least two hydroxyl groups.

Yet the shaped articles, more particularly fiber webs, obtained with these compositions are not fully satisfactory in all properties, more particularly the breaking strength, and/or with regard to the binder quantity required to obtain the specific properties.

It is an object of the present invention to provide an alternative formaldehyde-free binder system for fibrous and/or granular substrates which results in improved mechanical properties for fiber webs in particular and/or makes it possible to reduce the organic binder component quantities required to obtain the specific properties.

We have found that this object is achieved by the aqueous binder defined at the beginning.

Polymer A comprises ≥5 wt % and ≤100 wt %, preferably ≥60 wt % and ≤100 wt % and more preferably ≥90 wt % and ≤100 wt % of at least one α,β-monoethylenically unsaturated mono- or dicarboxylic acid [monomers A] and correspondingly ≥0 wt % and ≤95 wt %, preferably ≥0 wt % and ≤40 wt % and more preferably ≥0 wt % and ≤10 wt % of at least one further monomer other than the α,β-monoethylenically unsaturated mono- or dicarboxylic acids [monomers B] in polymerized form. The monomers A and monomers B sum to 100 wt %. It is particularly advantageous, however, for polymer A to be constructed exclusively of monomers A.

The monomers A comprise α,β-monoethylenically unsaturated, more particularly $C_3$ to $C_6$, preferably $C_3$ or $C_4$, mono- or dicarboxylic acids and also their fully or partially neutralized water-soluble salts, more particularly their alkali metal or ammonium salts, for example acrylic acid, methacrylic acid, ethylacrylic acid, itaconic acid, allylacetic acid, crotonic acid, vinylacetic acid, fumaric acid, maleic acid, 2-methylmaleic acid, but also monoesters of ethylenically unsaturated dicarboxylic acids, such as monoalkyl esters of maleic acid with $C_1$ to $C_8$ alcohols, and also the ammonium, sodium or potassium salts of the aforementioned acids. But the monomers A also comprise the anhydrides of corresponding α,β-monoethylenically unsaturated dicarboxylic acids, for example maleic anhydride or 2-methylmaleic anhydride. Preferably, monomer A is selected from the group comprising acrylic acid, methacrylic acid, crotonic acid, fumaric acid, maleic acid, maleic anhydride, 2-methylmaleic acid and itaconic acid, of which acrylic acid, methacrylic acid, maleic acid and/or maleic anhydride are particularly preferred.

Useful monomers B include all ethylenically unsaturated monomers that differ from the monomers A and are copolymerizable therewith. Useful monomers B include, for example, vinylaromatic compounds, such as styrene, α-methylstyrene, o-chlorostyrene or vinyltoluenes, vinyl halides, such as vinyl chloride or vinylidene chloride, esters of vinyl alcohol and $C_1$ to $C_{18}$ and preferably $C_2$ to $C_{12}$ monocarboxylic acids, such as vinyl acetate, vinyl propionate, vinyl n-butyrate, vinyl laurate and vinyl stearate, $C_1$ to $C_{12}$ alkyl vinyl ethers, such as methyl vinyl ether, ethyl vinyl ether, n-propyl vinyl ether, n-butyl vinyl ether, n-pentyl vinyl ether, n-hexyl vinyl ether, esters of preferably $C_3$ to $C_6$ α,β-monoethylenically unsaturated mono- and dicarboxylic acids, more particularly acrylic acid, methacrylic acid, maleic acid, fumaric acid and itaconic acid with generally $C_1$ to $C_{12}$, preferably $C_1$ to $C_8$ and more particularly $C_1$ to $C_4$ alkanols, particularly methyl acrylate, ethyl acrylate, n-butyl acrylate, isobutyl acrylate, pentyl acrylate, hexyl acrylate, heptyl acrylate, octyl acrylate, nonyl acrylate, decyl acrylate, 2-ethylhexyl acrylate, methyl methacrylate, ethyl methacrylate, n-butyl methacrylate, isobutyl methacrylate, pentyl methacrylate, hexyl methacrylate, heptyl methacrylate, octyl methacrylate, nonyl methacrylate, decyl methacrylate, 2-ethylhexyl methacrylate, dimethyl fumarate, di-n-butyl fumarate, dimethyl maleate, di-n-butyl maleate, nitriles of α,β-monoethylenically unsaturated carboxylic acids, such as acrylonitrile, methacrylonitrile, fumaronitrile, maleonitrile and also $C_{4-8}$ conjugated dienes, such as 1,3-butadiene (butadiene) and isoprene. The aforementioned monomers are generally ≥50% by weight, preferably ≥80% by weight and more preferably ≥90% by weight of the total amount of all monomers B and thus constitute the main monomers B. It is preferable according to the present invention for polymer A to comprise as main monomer B an ester of acrylic acid or methacrylic acid with a $C_1$ to $C_{12}$ alcohol, especially n-butyl acrylate or 2-ethylhexyl acrylate, a vinylaromatic compound, especially styrene, a nitrile of an α,β-monoethylenically unsaturated carboxylic acid, especially acrylonitrile and/or a vinyl ester of a $C_2$ to $C_{12}$ monocarboxylic acid, especially vinyl acetate, in polymerized form.

Useful monomers B further include a minor proportion of such ethylenically unsaturated monomers as comprise either at least one sulfonic acid group and/or its corresponding anion, or at least one amino, amido, ureido or N-heterocyclic group and/or the ammonium derivatives thereof that are alkylated or protonated at the nitrogen. Examples are acrylamide and meth-acrylamide, moreover vinylsulfonic acid, 2-acrylamido-2-methylpropanesulfonic acid, styrene-sulfonic acid and their water-soluble salts and also N-vinylpyrrolidone, 2-vinylpyridine, 4-vinyl-pyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide and 2-(1-imidazolin-2-onyl)ethyl methacrylate. The aforementioned monomers B are generally used in amounts ≤10% by weight, preferably ≤8% by weight and more preferably ≤5% by weight, all based on the total amount of monomers B. The monomer used is preferably acrylamide and/or methacrylamide in an amount of ≥0.5% and ≤4% by weight, based on the total amount of monomers B.

Monomers which typically enhance the integrity of films formed by a polymer matrix normally comprise at least one epoxy group, at least one carbonyl group or at least two nonconjugated ethylenically unsaturated double bonds. Examples thereof are monomers comprising two vinyl radicals, monomers comprising two vinylidene radicals and also monomers comprising two alkenyl radicals. Of particular advantage here are the diesters of dihydric alcohols with α,β-monoethylenically unsaturated monocarboxylic acids, among which acrylic acid and methacrylic acid are preferred. Examples of such monomers comprising two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate and also divinylbenzene, vinyl methacrylate, vinyl acrylate, allyl methacrylate, allyl acrylate, diallyl maleate, diallyl fumarate, methylenebis-acrylamide, cyclopentadienyl acrylate, triallyl cyanurate or triallyl isocyanurate. The aforementioned monomers B are generally used in amounts ≤10% by weight, preferably ≤5% by weight and more preferably ≤2% by weight, all based on the total amount of monomers B. It is allyl methacrylate, methylenebisacrylamide, divinylbenzene and/or 1,4-butylene glycol diacrylate which is or are used as preferred monomer in an amount of ≥0.1% and ≤2% by weight, based on the total amount of monomers B.

It is particularly preferable, however, for polymer A to be constructed exclusively of at least one α,β-monoethylenically unsaturated mono- or dicarboxylic acid in polymerized form.

Preparing polymers A is familiar to a person skilled in the art and is effected for example by free-radical polymerization of monomers A and B according to the method of bulk, emulsion, solution, precipitation or suspension polymerization (see also the preparation of corresponding polymers in WO 99/09100 page 5 line 12 to page 13 line 7). Polymers A are preferably obtained by free-radically initiated aqueous emulsion polymerization or by solution polymerization. Free-radically initiated aqueous emulsion polymerization is used to obtain polymers A particularly when the monomer mixture used for polymerization comprises monomers B in such amounts that a separate phase of monomer forms in the aqueous polymerization medium.

The conduct of free-radically initiated emulsion polymerizations of ethylenically unsaturated monomers in an aqueous medium has been extensively described before and therefore is well known to a person skilled in the art [cf. emulsion polymerization in Encyclopedia of Polymer Science and Engineering, Vol. 8, pages 659 ff. (1987); D. C. Blackley, in High Polymer Latices, Vol. 1, pages 35 ff. (1966); H. Warson, The Applications of Synthetic Resin Emulsions, Chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. The free-radically initiated aqueous emulsion polymerization reactions are typically carried out by the ethylenically unsaturated monomers being dispersed, by means of dispersants, in the aqueous medium in the form of monomer droplets and polymerized by means of a free-radical polymerization initiator, and aqueous polymer dispersions are formed.

The aqueous polymer dispersions used according to the present invention typically have polymer A solids contents of ≥10% and ≤70% by weight, frequently ≥20% and ≤65% by weight and often ≥40% and ≤60% by weight, all based on the aqueous polymer dispersion. The number average particle diameter determined via quasi-elastic light scattering (ISO standard 13321) in the case of polymers A obtained in an emulsion polymerization (cumulant z-average) is generally between 10 and 2000 nm, advantageously between 20 and 1000 nm and more advantageously between 50 and 700 nm or 80 to 400 nm.

The method of free-radically initiated solution polymerization is also familiar to a person skilled in the art and is carried out more particularly in water or in an organic solvent [see for example A. Echte, Handbuch der Technischen Polymerchemie, Chapter 6, VCH, Weinheim, 1993 or B. Vollmert, Grundriss der Makromolekularen Chemie, Volume 1, E. Vollmert Verlag, Karlsruhe, 1988; L. Kotzeva, J. Polym. Sci. A-27, 1989 (4), pages 1325ff; C. Erbil et al., Polymer 41, 2000, pages 1391ff; C. Yang, X. Lu Yun, J. Polym. Sci. 75(2), 2000, pages 327ff; M. Sen et al., Polymer 40(9), 1999, pages 913ff; F. Wang et al., Anal. Chem. 68, 1996, pages 2477ff; J. Velada et al., Macromol. Chem. and Phys. 196, 1995, pages 3171ff; J. M. Cowie, C. Haq, Br. Polym. J. 9, 1977, pages 241ff; J. Velada et al., Polymer Degradation and Stability 52, 1996, pages 273ff; A. Horta et al., Makromol. Chem., Rapid Commun. 8, 1987, pages 523ff; T. Hirano et al., J. Polym. Sci. A-38, 2000, pages 2487ff; B. E. Tate, Adv. Polymer Sci. 5, 1967, pages 214ff]. When polymer A is prepared in an organic solvent, the conclusion of the polymerization is generally followed by removal of the organic solvent to an at least partial extent, advantageously to an extent ≥50% by weight or ≥90% by weight and particularly advantageously completely and the polymer A is taken up in water, advantageously in deionized water. The corresponding methods are familiar to a person skilled in the art. For instance, exchanging the solvent for water may be done by the solvent being distilled off at least partially, advantageously completely in one or more stages, for example at atmospheric pressure (1 atm absolute) or at reduced pressure (<1 atm absolute), and replaced by water. Frequently, it can be beneficial for the solvent to be removed from the solution by passing steam thereinto, and in the process to be replaced by water at the same time. This is more particularly the case when the organic solvent has a certain volatility in steam. The resulting aqueous polymer solutions, which are used in the aqueous binder of the present invention, typically have polymer A solids contents of ≥10 and ≤70 wt %, frequently ≥20 and ≤65 wt % and often ≥40 and ≤60 wt %, all based on the aqueous polymer solution.

When polymer A is obtained by free-radically initiated aqueous emulsion polymerization, its glass transition temperature $T_g$ is frequently in the range ≥0 and ≤170° C., advantageously ≥10 and ≤100° C. and more advantageously ≥20 and ≤80° C. The glass transition temperature $T_g$ is the limiting value of the glass transition temperature to which said temperature tends with increasing molecular weight, according to G. Kanig (Kolloid-Zeitschrift & Zeitschrift für Polymere, Vol. 190, p. 1 equation 1). The glass transition temperature $T_g$ herein refers to the glass transition temperature determined by differential scanning calorimetry (DSC, at 20 K/min, midpoint measurement, DIN 53765). However, when polymers A are copolymers constructed of ≥60 and ≤100 wt % of monomers A in polymerized form, the glass transition temperature is frequently impossible to determine by the DSC method, since these polymers A decompose before reaching their glass transition temperature. In these cases, the glass transition temperature can be determined by the Fox equation.

The Fox equation also enables a person skilled in the art to identify polymers A in a suitable $T_g$ range and to synthesize them in a specific manner through controlled variation of monomers A and B in terms of type and quantity.

According to Fox (T. G. Fox, Bull. Am. Phys. Soc. 1956 [Ser. II] 1, page 123 and as per Ullmann's Encyclopädie der technischen Chemie, Vol. 19, page 18, 4th edition, Verlag Chemie, Weinheim, 1980), the glass transition temperature of at most lightly crosslinked copolymers is given to good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures, in degrees Kelvin, of the respective polymers composed only of one of the monomers 1, 2, ... n. The $T_g$ values for the homopolymers of most monomers are known and they are given for example in Ullmann's Encyclopedia of Industrial Chemistry, Vol. 5, Vol. A21, page 169, V C H Weinheim, 1992; further sources of homopolymer glass transition temperatures include, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989.

When polymer A is ≥90 wt % and ≤100 wt % and more particularly 100 wt % constructed of monomers A, this polymer A will have according to the present invention a weight average molecular weight in the range ≥1000 and ≤1 000 000 g/mol, advantageously ≥2000 and ≤50 000 g/mol and more advantageously ≥3000 and ≤10 000 g/mol. Determining the weight average molecular weight is familiar to a person skilled in the art and is effected more particularly by gel permeation chromatography using standard polymers of defined molecular weight.

As will be appreciated, it is also possible for the aqueous dispersions or solutions of polymer A to be dried, for example by the spray- or freeze-drying processes familiar to a person skilled in the art, to convert them into the corresponding polymer A powder and for the aqueous binder of the present invention to be obtained therefrom.

According to the present invention, in addition to polymer A, the aqueous binder further comprises as active constituent a polyol compound having at least 2 hydroxyl groups (polyol B). It is advantageous here to use such polyols B as are only minimally volatile, if at all, and hence have a correspondingly low vapor pressure, at the drying and/or curing temperatures.

Polyol B may in principle be a compound having a molecular weight ≤1000 g/mol or a polymeric compound having a molecular weight >1000 g/mol. As polymeric compounds having at least 2 hydroxyl groups there may be mentioned by way of example polyvinyl alcohol, partially hydrolyzed polyvinyl acetate, homo- or copolymers of hydroxyalkyl acrylates or hydroxyalkyl methacrylates, for example hydroxyethyl acrylate, hydroxyethyl methacrylate, hydroxypropyl acrylate or hydroxypropyl methacrylate. Examples of further polymeric polyols B useful according to the present invention are found inter alia in WO 97/45461 page 3 line 3 to page 14 line 33.

As polyol B having a molecular weight ≤1000 g/mol there come into consideration all those organic compounds which have at least 2 hydroxyl groups and a molecular weight ≤1000 g/mol. Examples are ethylene glycol, 1,2-propylene glycol, glycerol, 1,2-butanediol, 1,4-butanediol, pentaerythritol, trimethylolpropane, sorbitol, sucrose, glucose, 1,2-dihydroxybenzene, 1,3-dihydroxybenzene, 1,4-dihydroxybenzene, 1,2,3-trihydroxybenzene, 1,2-dihydroxycyclohexane, 1,3-dihydroxycyclohexane, 1,4-dihydroxycyclohexane and also, preferably, alkanolamines, for example compounds of the general formula (I)

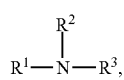

formula (I)

where $R^1$ is H, $C_1$ to $C_{10}$ alkyl or $C_2$ to $C_{10}$ hydroxyalkyl and $R^2$ and $R^3$ are each $C_2$ to $C_{10}$ hydroxyalkyl.

It is particularly preferable for $R^2$ and $R^3$ to each independently be $C_2$ to $C_5$ hydroxyalkyl and $R^1$ to be H, $C_1$ to $C_5$ alkyl or $C_2$ to $C_5$ hydroxyalkyl.

As compounds of the formula (I) there may be more particularly mentioned diethanolamine, triethanolamine, diisopropanolamine, triisopropanolamine, methyldiethanolamine, butyl-diethanolamine and/or methyldiisopropanolamine.

Examples of further molecular weight ≤1000 g/mol polyols B useful according to the present invention are likewise found in WO 97/45461 page 3 line 3 to page 14 line 33. Examples of further polyols C having a molecular weight ≤1000 g/mol and also >1000 g/mol are also found in WO 99/09100 page 13 line 29 to page 24 line 32. The polyols B mentioned are hereby expressly incorporated herein by reference.

Polyol B is preferably selected from the group comprising diethanolamine, triethanolamine, diisopropanolamine, triisopropanolamine, methyldiethanolamine, butyldiethanolamine and/or methyldiisopropanolamine, of which triethanolamine is particularly preferred.

The aqueous binders of the present invention preferably utilize polymer A and polyol B in such a mixing ratio relative to each other that the weight ratio of polymer A to polyol B (based on solids) is in the range from 100:1 to 1:2, advantageously in the range from 50:1 to 1.5:1 and more advantageously in the range from 10:1 to 2:1.

It is particularly advantageous for the amounts of polymer A and polyol B to be chosen such that the ratio of the number of carboxyl equivalents in polymer A to the number of hydroxyl equivalents in polyol B is in the range from 20:1 to 1:1, preferably in the range from 15:1 to 1.5:1 and more preferably in the range from 12:1 to 2:1 (and an anhydride group here being reckoned as two carboxyl groups).

In addition to at least one polymer A and at least one polyol B, the aqueous binder composition of the present invention further comprises at least one salt compound which at 20° C. and 1 atm (=1.013 bar absolute) has a solubility ≥10 g in 100 g of deionized water [salt C].

According to the present invention, as salts C it is possible to use any salt compounds which, under the aforementioned conditions, have a solubility ≥10 g and advantageously ≥15 g in 100 g of deionized water. Salts C herein are organic and inorganic compounds constructed of positively charged ions (the so-called cations) and negatively charged ions (the so-called anions), which in the solid state are generally present in a crystal lattice. On dissolving in water, salts C decompose into their corresponding cations and anions, which are frequently surrounded by a hydrate sheath and are known as hydrated. The amount of cations and anions in salts C is such that salts C are themselves electroneutral, i.e., the number of positive charges from the cations is equal to the number of negative charges from the anions. However, it is also essential that, in the context of this specification, the cations of salts C shall not be protons ($H^+$) and the anions of salts C shall not be hydroxide ions ($OH^-$).

Useful cations include especially monovalent (metal) ions, for example sodium ions ($Na^+$), potassium ions ($K^+$) or else ammonium ions ($NH_4^+$), divalent metal ions, for example calcium ions ($Ca^{2+}$), magnesium ions ($Mg^{2+}$), zinc ions ($Zn^{2+}$) or iron(II) ions ($Fe^{2+}$), or trivalent metal ions, for example aluminum ions ($Al^{3+}$) or iron(III) ions ($Fe^{3+}$), of which the ions of sodium and of potassium are particularly preferred.

Useful anions include especially monovalent anions, for example halide ions, such as fluoride ($F^-$), chloride ($Cl^-$), bromide ($Br^-$) or iodide ($I^-$), or nitrate ($NO_3^-$), formate ($HCO_2^-$), acetate ($CH_3CO_2^-$) or propionate ($C_2H_5CO_2^-$), divalent anions, for example carbonate ($CO_3^{2-}$) or sulfate ($SO_4^{2-}$) or trivalent anions such as, for example, phosphate ($PO_4^{3-}$), of which chloride, sulfate and phosphate are preferred and chloride and sulfate are particularly preferred.

As will be appreciated, salt C can also consist of different cations and/or different anions, as in the case of $KAl(SO_4)_2$ for example.

Salts C are preferably alkali metal salt compounds, especially purely inorganic alkali metal salt compounds (alkali metal cations with anions based on inorganic mineral acids), such as, advantageously, sodium chloride (NaCl), potassium chloride (KCl), sodium sulfate ($Na_2SO_4$), potassium sulfate ($K_2SO_4$), sodium phosphate ($Na_3PO_4$) and/or potassium phosphate ($K_3PO_4$), of which sodium chloride, potassium chloride, sodium sulfate and/or potassium sulfate are particularly preferred.

The amount of salt C in the binder of the present invention is advantageously ≥0.1 and ≤40 wt %, preferably ≥1 and ≤20 wt % and more preferably ≥5 and ≤15 wt %, all based on the summed total amounts of polymer A and polyol B. However, it is essential that on using a salt C comprising so-called water of crystallization, for example sodium sulfate decahydrate ($Na_2SO_4.10\ H_2O$), iron(II) sulfate heptahydrate ($FeSO_4.7\ H_2O$), sodium carbonate decahydrate ($Na_2CO_3.10\ H_2O$) or magnesium chloride hexahydrate ($MgCl_2.6\ H_2O$), the amount of salt C is determined minus the water of crystallization in salt C.

The method of producing the aqueous binder of the present invention is not critical and is familiar to a person skilled in the art, taking the form for example of the individual components being mixed in an aqueous medium in any desired manner. In a further embodiment, the aqueous binder can also be produced by forming polymer A in an aqueous medium and admixing polyol B and salt C to the aqueous medium of this polymer A. However, it is essential in this connection that salt C can also be formed in situ in the aqueous medium at any desired stage by neutralizing an acid with a base (for example $H_2SO_4$ or HCl with NaOH or KOH) or a base with an acid (for example NaOH, KOH or the alkali metal salt of a polycarboxylic acid, especially the sodium or potassium salt of polymer A, with $H_2SO_4$ or HCl).

The aqueous binder of the present invention may comprise ≤5 wt %, frequently ≤1.0 wt %, often ≤0.5 wt % and also frequently ≥0.1 wt % and often ≥0.3 wt %, based on the summed total amounts of polymer A, polyol B and salt C (solid/solid), of a phosphorus-containing reaction accelerant. Phosphorus-containing reaction accelerants are disclosed in EP-A 583086 and EP-A 651088 for example. Reaction accelerants more particularly comprise polyphosphoric acid, hypophosphoric acid, phosphoric acid, alkylphosphinic acid or oligomers/polymers thereof.

Preferably, however, the aqueous binders of the present invention comprise no phosphorus-containing reaction accelerants. Yet the binders of the present invention may comprise esterification catalysts familiar to a person skilled in the art, for example sulfuric acid or p-toluenesulfonic acid.

Furthermore, the aqueous binders of the present invention may also comprise further, optional auxiliary substances familiar to a person skilled in the art, examples being thickeners, defoamers, neutralizers, buffers, preservatives, finely divided inert fillers, such as alumino-silicates, quartz, precipitated or pyrogenous silica, light or heavy spar, talc or dolomite, color-conferring pigments, such as titanium white, zinc white or iron oxide black, adhesion promoters and/or flame retardants.

When the aqueous binders of the present invention are to be used as binders for mineral fibers and/or glass fibers or to be more precise fibrous nonwoven webs produced therefrom, the aqueous binders are advantageously admixed with ≥0.001 and ≤5 wt % and more advantageously ≥0.05 and ≤2 wt %, based on the summed total amounts of polymer A, polyol B and salt C, of at least one silicon-containing organic compound (adhesion promoter), for example an alkoxysilane, such as methyltrimethoxysilane, n-propyltrimethoxysilane, n-octyltrimethoxysilane, n-decyltriethoxysilane, n-hexadecyltrimethoxysilane, dimethyldimethoxysilane, trimethylmethoxysilane, 3-acetoxypropyltrimethoxysilane, 3-aminopropyltrimethoxysilane, 3-aminopropyltriethoxysilane, 3-chloropropyltrimethoxysilane, (3-glycidyloxypropyl)trimethoxysilane, 3-mercaptopropyltrimethoxysilane and/or phenyltrimethoxysilane, in which case functionalized alkoxysilanes, such as 3-acetoxypropyltrimethoxysilane, 3-aminopropyltrimethoxysilane, 3-aminopropyltriethoxysilane, 3-chloropropyltrimethoxysilane, (3-glycidyloxypropyl)trimethoxy-silane and/or 3-mercaptopropyltrimethoxysilane, are particularly preferred.

As will be appreciated, the aqueous binders of the present invention may still comprise <5 wt % of water-soluble organic solvents [solubility >10 g per 100 g of deionized water at 20° C. and 1 atm (absolute)], for example acetone, methanol, ethanol and/or isopropanol. Advantageously, however, the organic solvent content of the aqueous binder is ≤1 wt % and more preferably ≤0.5 wt %.

The aqueous binders of the present invention typically have solids contents (formed from the summed total amount of polymer A, polyol B and salt C when reckoned as solids) of ≥1 and ≤80 wt %, advantageously ≥20 and ≤70 wt % and more advantageously ≥40 and ≤60 wt %, all based on the aqueous binder.

The aqueous binders of the present invention typically have pH values (measured at 23° C.; diluted with deionized water to a solids content of 10 wt %) in the range of ≥1 and ≤10, advantageously ≥2 and ≤6 and more advantageously ≥2.5 and ≤5. Any acidic or basic compound familiar to a person skilled in the art can be used for setting the pH. More particularly, however, the acidic or basic compounds used are not volatile at the temperatures during drying and/or curing, examples being sulfuric acid or phosphoric acid on the one hand and sodium hydroxide or potassium hydroxide on the other.

The aforementioned aqueous binders are very useful as binders for fibrous and/or granular substrates. The aqueous binders mentioned can therefore be used with advantage for production of shaped articles from fibrous and/or granular substrates.

Granular and/or fibrous substrates are familiar to a person skilled in the art. Examples include wood chips, wood fibers, cellulose fibers, textile fibers, polymeric fibers, glass fibers, mineral fibers or natural fibers such as jute, flax, hemp or sisal, but also cork chips, sand as well as other organic or inorganic natural and/or synthetic granular and/or fibrous compounds whose longest dimension is ≤10 mm, preferably ≤5 mm and more particularly ≤2 mm in the case of granular substrates. It will be appreciated that the term substrate shall also comprehend the fiber webs obtainable from fibers, for example the mechanically consolidated (needled, for example) or chemically, for example with melamine-formaldehyde resins, pre-bonded fiber webs. The aqueous binder of the present invention is especially advantageously useful as a formaldehyde-free binder system for the aforementioned fibers and/or fiber webs formed therefrom, and the fiber webs are particularly preferred.

The process for producing a shaped article from a granular and/or fibrous substrate and the aforementioned aqueous binder advantageously comprises applying the aqueous binder of the present invention uniformly to the granular and/or fibrous substrate (impregnating it), optionally shaping the granular and/or fibrous substrate impregnated with the aqueous binder and then subjecting the impregnated granular and/or fibrous substrate to a thermal treatment step at a temperature ≥110° C.

The treatment (impregnation) of the granular and/or fibrous substrate with the aqueous binder of the present invention is generally performed by the aqueous binder of the present invention being uniformly applied to the surface of the granular and/or fibrous substrate. The amount of aqueous binder for this is chosen such that ≥0.1 g and ≤100 g, preferably ≥1 g and ≤50 g and more preferably ≥5 g and ≤30 g of binder formed from the summed total amounts of polymer A, polyol B and salt C (reckoned as solids) are used per 100 g of granular and/or fibrous substrate. The actual method of impregnating the granular and/or fibrous substrate is familiar to a person skilled in the art and takes the form for example of drenching or spraying the granular and/or fibrous substrate.

In one possible embodiment of the present invention, the binder is obtained in a separate step prior to application to the granular and/or fibrous substrate, viz., by mixing polymer A, polyol B and salt C in any desired manner. It will be appreciated that the binder is also obtainable by mixing polymer A with a mixture of polyol B and salt C in an aqueous medium. Polymer A is advantageously used in the form of an aqueous polymer dispersion or in the form of an aqueous polymer solution. When the site for applying the binder to the granular and/or fibrous substrate is located in a mixing drum or in a mixing sector for example, polymer A, polyol B and salt C, particularly in the form of its aqueous solution, can be metered into the mixing drum or into the mixing sector at different locations, for example in the course of the aqueous wood destructurization into the blowline between the refiner and the dryer. In this case, components A, B and C only become mixed together on the granular and/or fibrous substrate. But it is also possible for polymer A, more particularly in the form of its aqueous dispersion or solution, to be mixed with polyol B and to add this mixture to the mixing drum or mixing sector. But it is self-evidently also possible for polymer A, more particularly in the form of its aqueous dispersion or solution, polyol B and salt C to be mixed in a mixing chamber, mixing nozzle or some other static or dynamic mixing device only just immediately before application to the granular and/or fibrous substrate.

After impregnation, the granular and/or fibrous substrate is optionally formed into the desired shape, for example by introduction into a heatable press or mold. Subsequently, the shaped impregnated granular and/or fibrous substrate is dried and cured in a manner familiar to a person skilled in the art.

Drying and curing the optionally shaped impregnated granular and/or fibrous substrate is frequently effected in two temperature stages, of which the drying stage takes place at a temperature <110° C., preferably ≥20° C. and ≤100° C. and more preferably ≥40 and ≤100° C. and the curing stage takes place at a temperature ≥110° C., preferably ≥130 and ≤250° C. or a 160 and ≤220° C. and more preferably ≥170° C. and ≤210° C.

The drying stage advantageously takes the form of drying at a temperature <100° C. until the shaped impregnated granular and/or fibrous substrate, which frequently has yet to acquire its ultimate shape (and hence is referred to as a blank or intermediate article), has a residual moisture content ≤30 wt % preferably ≤15 wt % and more preferably ≤10 wt %. This residual moisture content is generally determined by about 1 g of the resulting blank being weighed at room temperature, then dried at 110° C. for 2 minutes and then cooled and reweighed at room temperature. The residual moisture content is equal to the weight difference of the blank before and after drying at 110° C., based on the weight of the blank before drying, multiplied by a factor of 100.

The blank obtained in this way is still formable after heating to a temperature of about 100° C. and can be formed at this temperature into the ultimate shape desired for the shaped article.

The subsequent curing stage advantageously takes the form of the blank being heated at a temperature ≥110° C. until it has a residual moisture content ≤2 wt %, preferably ≤1 wt % or ≤0.5 wt % and more preferably ≤0.1 wt %, in the course of which the binder cures as a result of a chemical reaction of esterification.

The shaped articles are frequently produced by the blank being formed, in a molding press in the aforementioned temperature ranges, into the ultimate shape and being cured thereafter.

But it is also possible, as will be appreciated, for the drying stage and the curing stage of the shaped articles to take place in one operation, for example in a molding press.

The shaped articles obtainable by the process of the present invention and more particularly the fiber webs obtainable by the process of the present invention have advantageous properties, especially an improved breaking strength compared with prior art shaped articles. It is further also possible to use the generally inexpensive water-soluble salt C to reduce the amounts of the costlier organic components A and B without the mechanical properties of the shaped articles, for example their breaking strength, suffering.

The examples which follow illustrate the invention and are nonlimiting.

EXAMPLES

The inventive binders and the comparative binder were produced using a 50 wt % aqueous solution of a polyacrylic acid having a weight average molecular weight of 6000 g/mol.

Triethanolamine (>99 wt %) from BASF SE was used as polyol B.

The following were used as salts C:
sodium sulfate anhydrous (>99 wt % from Sigma-Aldrich)
potassium chloride anhydrous (>99 wt % from Merck)
sodium chloride anhydrous (>99 wt % from Sigma-Aldrich)

To produce the aqueous binder liquors, in each case 1000 g of the aforementioned 50 wt % aqueous solution of polyacrylic acid were initially charged to a 5 l glass beaker at 20 to 25° C. (room temperature), 75 g of triethanolamine were added in each case with stirring, and the aqueous solution obtained was adjusted to pH 2.5 by addition of 50 wt % aqueous sulfuric acid solution. These solutions were each admixed with the salts indicated in table 1, in the respectively indicated amounts, by stirring for 10 minutes until homogeneous. Portions were then taken from the respective solutions and adjusted with deionized water to a solids content of 4% by weight. The solutions obtained are referred to as binder liquors A1 to A7. No salts were mixed to comparative liquor V.

TABLE 1

Type and amount of alkali metal salts in production of binder liquors

| Binder liquor | Alkali metal salt | Amount in g (wt %*) |
|---|---|---|
| V | — | — (0) |
| A1 | sodium sulfate | 28.75 (5) |
| A2 | sodium sulfate | 57.50 (10) |
| A3 | sodium sulfate | 86.25 (15) |
| A4 | potassium chloride | 28.75 (5) |
| A5 | potassium chloride | 57.50 (10) |
| A6 | sodium chloride | 28.75 (5) |
| A7 | sodium chloride | 57.50 (10) |

*percentages are based on sum total of the polyacrylic acid used and of the triethanolamine The shaped articles were produced using glass fiber webs (27×28.5 cm) from Whatman GF/A No. 1820-915 having a basis weight of 54 g/m².

To apply the binder liquors (impregnation), the glass fiber webs were passed in the longitudinal direction, on an endless PES foraminous belt, at a belt speed of 60 cm per minute, through the aforementioned 4 wt % aqueous binder liquors A1 to A7 and also V. The aqueous binder liquors were subsequently sucked off to adjust the wet add-on to 270 g/m² (corresponding to 10.8 g/m² of binder reckoned as solids). The impregnated glass fiber webs thus obtained were dried/cured in a Mathis oven on a plastics mesh support at 180° C. in a maximum hot air stream for 3 minutes. After cooling to room temperature, test strips measuring 240×50 mm were cut in the fiber longitudinal direction. The test strips obtained were subsequently conditioned for 24 hours at 23° C. and 50% relative humidity. The glass fiber web test strips obtained are hereinbelow referred to as test strips A1 to A7 and also V, in correspondence with the employed binder liquors A1 to A7 and also V.

Determination of Wet Breaking Strength

To determine their wet breaking strength, the test strips were kept in deionized water at 80° C. for 15 minutes and thereafter excess water was swabbed off with a woven cotton fabric before measurement. Breaking strength was determined on a Zwick-Roell Z005 type tensile tester. Test strips A1 to A7 and also V were clamped vertically into a tensioning device such that the free clamped length was 200 mm. Thereafter, the clamped test strips were pulled apart in the opposite direction at a speed of 25 mm per minute until the test strips broke. The higher the force needed to break the test strips, the better the corresponding breaking strength. Five measurements were carried out in each case. The values reported in table 2 each represent the average value of these measurements.

Determination of Breaking Strength at 180° C.

Breaking strength at 180° C. was determined in a Zwick-Roell tensile tester of the Z 010 TH2 A type. Test strips A1 to A7 and also V were clamped vertically into a tensioning device such that the free clamped length was 240 mm. Breaking strength was determined by first heating test strips A1 to A7 and also V at 180° C. for 60 seconds and then pulling them apart at this temperature in the opposite direction at a speed of 25 mm per minute until they broke. Five measurements were carried out in each case. The values likewise reported in table 2 each represent the average value of these measurements.

TABLE 2

Summary of breaking strength results
[reported values each in N/50 mm]

| Test strip | Wet breaking strength | Breaking strength at 180° C. |
|---|---|---|
| V | 19 | 72 |
| A1 | 20 | 75 |
| A2 | 21 | 85 |
| A3 | 20 | 84 |
| A4 | 22 | 85 |
| A5 | 25 | 87 |
| A6 | 25 | 92 |
| A7 | 22 | 94 |

It is clearly apparent from the results that the salt-containing binder liquors A1 to A7 are advantageous for the wet breaking strength and particularly advantageous for the breaking strength at 180° C. of the fiber webs obtained with these binder liquors.

We claim:

1. An aqueous binder, comprising as active constituents:
a polymer A obtained by free-radical polymerization, the polymer comprising >5 wt% and <100 wt% of an $\alpha,\beta$-monoethylenically unsaturated monocarboxylic acid or an $\alpha,\beta$-monoethylenically unsaturated dicarboxylic acid in polymerized form,
a polyol compound B having at least two hydroxyl groups and a molecular weight of <1000 g/mol, and
a salt compound C which at 20° C. and 1 atm absolute has a solubility of >10 g in 100 g of deionized water;
wherein the salt compound C is selected from the group consisting of sodium chloride, potassium chloride, sodium sulfate, and potassium sulfate, the amount of salt C is >0.1 and <40 wt%, based on summed total amounts of polymer A and polyol B, the aqueous binder comprises no phosphorus-containing reaction accelerants and the weight ratio of polymer A to polyol B is in the range of 100:1 to 1.5:1.

2. The aqueous binder according to claim 1, wherein the polymer A comprises at least one compound in polymerized form that is selected from the group consisting of acrylic acid, methacrylic acid, crotonic acid, fumaric acid, maleic acid, maleic anhydride, 2-methylmaleic acid and itaconic acid.

3. The aqueous binder according to claim 1, wherein the polymer A is constructed exclusively of an $\alpha,\beta$-monoethylenically unsaturated mono- or dicarboxylic acid in polymerized form.

4. The aqueous binder according to claim 1, wherein the polyol B is an alkanolamine.

5. The aqueous binder according to claim 1, wherein the polyol B is triethanolamine.

6. The aqueous binder according to claim 1, wherein the salt C is at least one selected from the group consisting of sodium chloride, potassium chloride, and sodium sulfate.

7. The aqueous binder according to claim 1, wherein a weight ratio of polymer A to polyol B, based on solids, is from 50:1 to 2:1.

8. The aqueous binder according to claim 1, wherein an equivalence ratio of carboxyl groups of polymer A to hydroxyl groups of polyol B is from 20:1 to 1:1.

9. The aqueous binder according to claim 1, wherein an amount of salt C is from 5 to 40 wt%, based on summed total amounts of polymer A and polyol B.

10. The aqueous binder according to claim 1, wherein the binder is suitable for production of shaped articles from granular substrates, fibrous substrates, or both.

11. A process for producing a shaped article from granular substrates, fibrous substrates, or both, the process comprising: applying the aqueous binder according to claim 1 to the granular substrate, fibrous substrate, or both;
optionally shaping the granular substrate, fibrous substrate, or both, treated with the aqueous binder; and then
subjecting the granular substrate, fibrous substrate, or both, thus treated, to a thermal treatment at a temperature of >110° C.

12. The process according to claim 11, wherein the granular substrate, fibrous substrate, or both are a mechanically consolidated or chemically prebonded fiber web.

13. A shaped article obtained by the process according to claim 11.

14. An aqueous binder, consisting essentially of as active constituents:
a polymer A obtained by free-radical polymerization, the polymer comprising >5 wt% and <100 wt% of an $\alpha,\beta$-monoethylenically unsaturated monocarboxylic acid or an $\alpha,\beta$-monoethylenically unsaturated dicarboxylic acid in polymerized form,
a polyol compound B having at least two hydroxyl groups and a molecular weight of <1000 g/mol, and
a salt compound C which at 20° C. and 1 atm absolute has a solubility of >10 g in 100 g of deionized water;
wherein the salt compound C is selected from the group consisting of sodium chloride, potassium chloride, sodium sulfate, and potassium sulfate, the amount of salt C is >0.1 and <40 wt%, based on summed total amounts of polymer A and polyol B, and the weight ratio of polymer A to polyol B is in the range of 100:1 to 1.5:1.

15. The aqueous binder according to claim 14, wherein the salt C is at least one selected from the group consisting of sodium chloride, potassium chloride, and sodium sulfate.

16. The aqueous binder according to claim 14, wherein the polymer A comprises at least one compound in polymerized form that is selected from the group consisting of acrylic acid, methacrylic acid, crotonic acid, fumaric acid, maleic acid, maleic anhydride, 2-methylmaleic acid and itaconic acid.

17. The aqueous binder according to claim 14, wherein the polymer A is constructed exclusively of an $\alpha,\beta$-monoethylenically unsaturated mono- or dicarboxylic acid in polymerized form.

18. The aqueous binder according to claim 14, wherein the polyol B is an alkanolamine.

19. The aqueous binder according to claim 14, wherein the polyol B is triethanolamine.

* * * * *